July 16, 1957  D. D. WILSON  2,799,112
FISHING ROD ATTACHMENT
Filed March 28, 1956
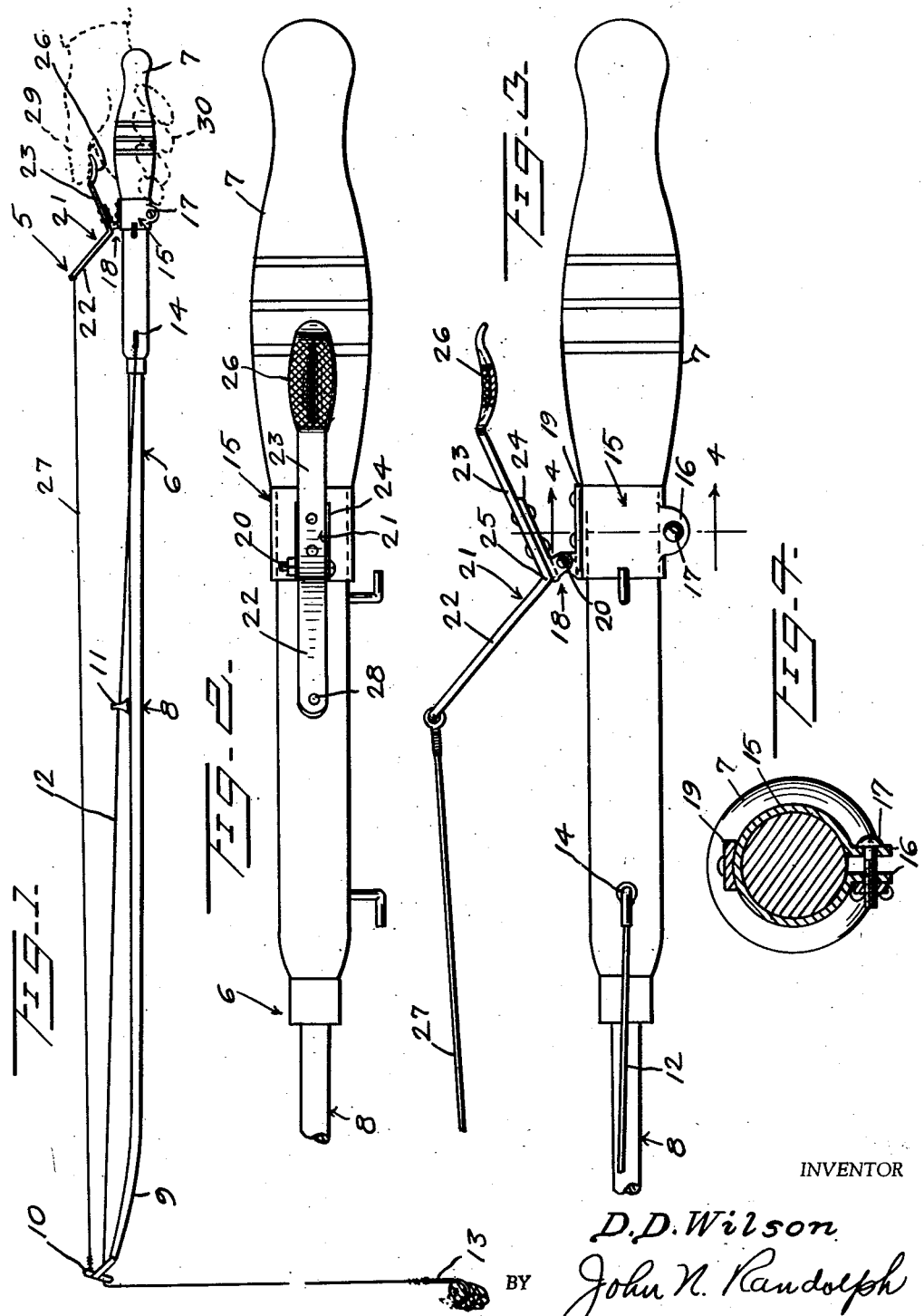
INVENTOR
D. D. Wilson
BY John N. Randolph
ATTORNEY

United States Patent Office 2,799,112
Patented July 16, 1957

2,799,112

FISHING ROD ATTACHMENT

Don D. Wilson, Hastings, Mich.

Application March 28, 1956, Serial No. 574,417

6 Claims. (Cl. 43—19.2)

This invention relates to an attachment for fishing rods by means of which the rod tip can be actuated without moving the rod but or handle for jigging a fish bait attached to an end of a fishing line which depends from the tip of the fishing rod or pole.

More particularly, it is an aim of the present invention to provide a rod tip actuator of extremely simple construction which may be readily attached to or detached from a conventional fishing rod or pole, and which will function in conjunction therewith to enable the fisherman to jig the fish bait or lure as slowly or as rapidly as desired by the user.

A further object of the invention is to provide a rod tip actuator through the use of which a quick jerk can be transmitted to the bait or lure for hooking a fish and which can be released to return the bait or lure to its previous position if the fish is not hooked.

Various other objects and advantages of the invention will hereinafter become more fully apparent from the following description of the drawing, illustrating a presently preferred embodiment thereof, and wherein:

Figure 1 is a side elevational view of a conventional fishing rod or pole, shown equipped with the tip actuator;

Figure 2 is an enlarged top plan view of the butt end of the rod or pole and showing a part of the actuator mounted thereon;

Figure 3 is an enlarged side elevational view, looking in the same direction as in Figure 1, and showing the butt end of the rod or pole equipped with the attachment, and Figure 4 is an enlarged cross sectional view, taken substantially along a plane as indicated by the line 4—4 of Figure 3.

Referring more specifically to the drawing, for the purpose of illustrating a preferred application and use of the rod or pole tip actuator, designated generally 5 and comprising the invention, a conventional fishing rod or pole is illustrated in the drawing and is designated generally 6. The rod or pole 6 is of the type commonly used for ice fishing but it will be understood that the attachment 5 may be utilized with any conventional fishing rod or pole having a resilient or springy tip end, including those equipped with means for supporting a conventional fishing reel and those to which a fishing line is secured. The rod 6 as illustrated includes a butt or handle portion 7 from the forward end of which projects a rod portion 8. The rod portion 8 may be formed of any suitable material conventionally employed for such purpose and is normally tapered toward the outer end or tip portion 9 thereof, so that the tip portion 9 is relatively resilient or springy. The tip of the fishing rod has attached thereto a conventional line guide 10 and one or more additional line guides 11 are attached to the rod portion 8 between the tip guide 10 and the butt 7. A conventional fishing line 12 extends through the line guides 10 and 11 and has an outer end portion extending downwardly from the tip guide 10 and to which is attached a fish bait or lure 13. The inner end of the line 12 is shown anchored to an element 14 of the rod butt 7, as is conventional in ice fishing rigs, but could be connected to a fishing reel, not shown, supported on the rod butt. The parts 6 through 14, inclusive, are conventional and have been illustrated and briefly described merely to afford a better understanding of the attachment 5.

The rod and pole tip actuator includes a relatively wide split clamping ring 15 the end portions of which are defined by apertured ears 16 which are disposed substantially parallel to one another and through which extends the bolt portion of a bolt and wing nut fastening 17, as best seen in Figure 4. The fastening 17 is applied after the clamp 15 is positioned around a portion of the rod butt 7 and is tightened for securing the band 15 immovably thereto. A hinge 18 has one leaf 19 thereof secured to a part of the band 15, which is spaced from the ears 16, so that the hinge axis 20 is disposed crosswise of the axis of the band 15 and of the rod or pole 6.

A lever, designated generally 21, includes arms 22 and 23 which are disposed preferably at an obtuse angle to one another. The arm 23 is disposed longitudinally on and is secured to the other upper leaf 24 of the hinge 18 and so that the hinge pivot 20 is located adjacent the apex of the arms 22 and 23. The other outer end of the arm 23, which is located remote from the apex 25 of the lever, is bent at an angle to the remainder of said arm so as to be disposed more nearly parallel to the axis of the rod 6 and is dished on its upper side to provide a thumb rest 26. The lever 21 is mounted so that the arm 23 extends generally in a direction toward the rear end of the butt 7 and so that the arm 22 extends generally toward the forward end of said butt 7. A connecting element 27 has a forward end connected to the upper portion of the tip guide 10 and a rear end connected to the outer end of the lever arm 22 through an opening 28 therein. Said connecting element 27 may be a flexible element such as a length of cord or wire or may constitute a connecting rod which is substantially rigid. The connecting element 27 is nonelastic.

When the lever arm 22 is disposed nearly parallel to the axis of the rod or pole 6 and in a position extending forwardly from the pivot 20, the tip portion 9 will be disposed substantially in alignment with the axis of the rod or pole 6 and if the element 27 is a length of cord or wire some slack may exist therein. The actuator 5 is mounted sufficiently forward of the rear end of the butt 7 so that the angler may grasp the rear handle portion of the butt 7 with either hand and may place the thumb of the hand thus employed on the upper or forward side of the thumb rest 26. By exerting a rearward and/or downward pressure on the thumb rest 26, the lever 21 will fulcrum with the outer hinge leaf 24 in a clockwise direction as seen in Figures 1 and 3 about the hinge pivot 20 to cause the lever arm 22 to swing upwardly and rearwardly to or beyond its position of Figures 1 and 3. In this position of the lever arm 22, a pull will have been exerted rearwardly on the connecting element 27 which in turn will have exerted an upward and rearward pull on the tip guide 10 for flexing the tip 9 of the rod or pole upwardly, as illustrated in Figure 1. It will be apparent that by swinging the lever 21 further in a clockwise direction until the thumb rest 26 contacts the butt 7, that the tip portion 9 may be flexed upwardly to a substantially greater extent than as seen in Figure 1.

From the foregoing it will be apparent that the thumb 29 of the hand 30, as seen in broken lines in Figure 1, which is utilized for supporting the rod or pole 6 may be employed for manipulating the tip portion 9 by exerting a back and forth rocking movement on the lever 21. This will cause the tip portion 9 to be drawn upwardly and rearwardly when the lever 21 is rocked clockwise as seen in Figure 1, and when pressure is released on the thumb rest 26, the tensioned tip portion 9 will be spring urged by the resiliency thereof back toward an extended position in alignment with the remainder of the rod or pole. This movement of the tip portion 9 and tip guide 10, during which the line 12 will slide back and forth therethrough, will cause the lure 13 to move to a limited extent toward and away from the axis of the rod or pole 6 in a direction normal thereto, and will also cause the lure 13 to move to a limited extent lengthwise or substantially parallel to the axis of the rod or pole 6. Thus, the bait 13 can be jigged effectively without any movement of the rod butt 7 or the rod portion located adjacent thereto or without drawing in or paying out the line 12.

The lever 21 can also be rocked rapidly in a clockwise direction as seen in Figure 1 for setting the hook of the bait 13 in a fish which is nibbling on the bait by thus effecting a sudden movement of the bait. If the setting of the hook is not accomplished, the bait can be readily returned to its previous position by releasing pressure on the thumb rest 26. The angler by intermittently applying pressure to the thumb rest 26 and releasing pressure gradually therefrom can manipulate or jig the bait 13 at any rate desired.

Various modifications and changes are contemplated and may obviously be resorted to, without departing from the spirit or scope of the invention as hereinafter defined by the appended claims.

I claim as my invention:

1. A rod or pole tip actuator comprising, in combination with a fishing rod or pole having a tip guide, a lever member, means mounting said lever member on a portion of the fishing rod or pole remote from the tip guide for rocking movement relative to the rod or pole about an axis disposed substantially crosswise of the rod or pole, and a connecting element having a forward end secured to the tip guide and a rear end secured to said lever member at a point spaced from the pivot thereof for exerting a rearward pull on said connecting element for flexing the tip portion of the rod or pole when the lever member is rocked away from the tip portion and for permitting the tip portion to resume a normal position when pressure is released from the lever member.

2. A rod or pole tip actuator as in claim 1, said lever member including angularly disposed arms, one of said arms extending from the axis about which the lever member fulcrums in a direction generally toward the tip portion of the rod or pole and to which arm said connecting element is attached, and said other arm extending generally toward the other rear end of the rod or pole and being adapted to be manually engaged for rocking the first mentioned arm in a direction to exert a pull on said connecting element for flexing the tip portion of the rod.

3. A rod or pole tip actuator as in claim 2, said lever arms being disposed at an obtuse angle to one another, and the free end portion of said last mentioned lever arm being disposed at an angle to the axis of said arm and providing a thumb rest.

4. A rod or pole tip actuator as in claim 1, said mounting means including a hinge the axis of which constitutes the axis of rocking movement of the lever member, said hinge including an outer leaf secured to a portion of the lever member and disposed at an angle to another portion thereof to which the connecting element is attached.

5. A rod or pole tip actuator as in claim 4, said mounting means including a clamp detachably embracing a portion of the rod or pole, and the other leaf of said hinge being secured to said clamp.

6. A fishing rod or pole tip actuator comprising a connecting element having a forward end adapted to be secured to a line guide mounted on the tip of a fishing rod or pole, a manually manipulatable member, and means mounting said manually manipulatable member on the rod or pole remote from the tip thereof, said manually manipulatable member having a portion secured to the other rear end of said connecting element and another portion adapted to be manually engaged for actuating said manipulatable member to exert a rearward pull on the connecting element for flexing and tensioning the tip portion of the rod or pole, said manually manipulatable member and the connecting element being moved in the opposite direction by the tensioned tip portion of the rod or pole upon release of the pressure of said manual engagement.

References Cited in the file of this patent
UNITED STATES PATENTS
664,889    Ogimura _____ Jan. 1, 1901